J. COLLINSON.
ELECTRICAL RESISTANCE.
APPLICATION FILED MAR. 4, 1915.
1,267,978.
Patented May 28, 1918
2 SHEETS—SHEET 1.
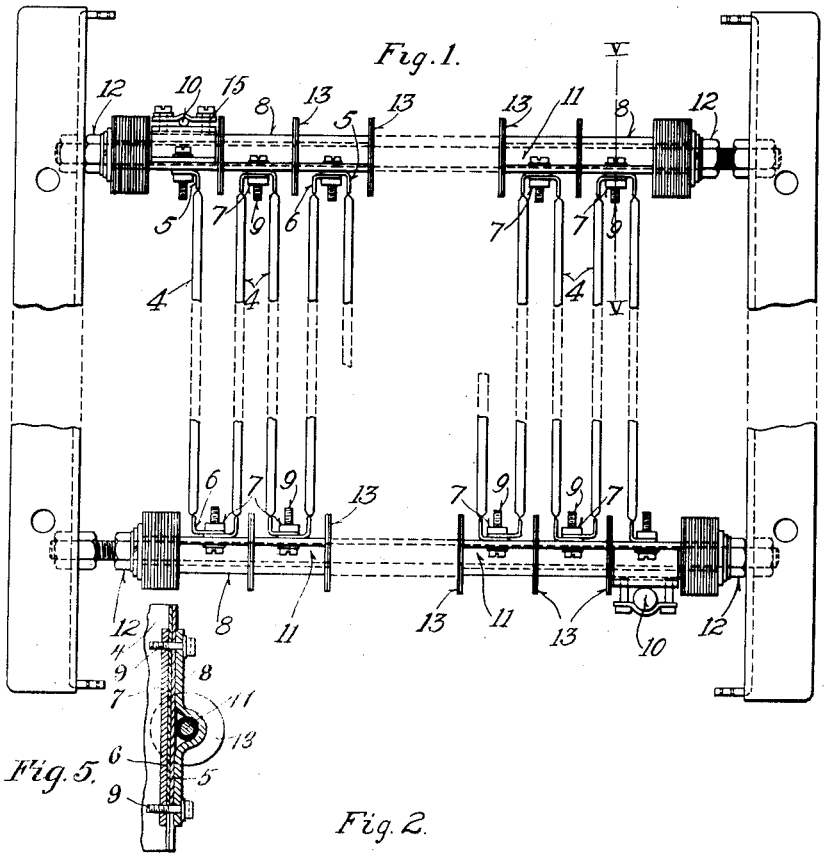
Fig. 1.
Fig. 5.
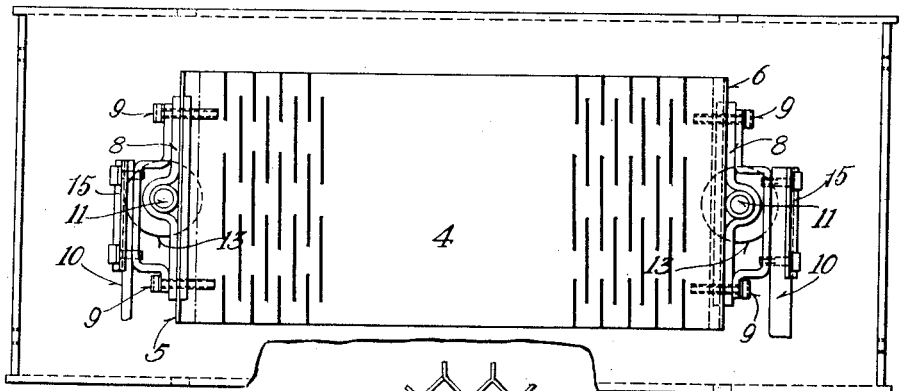
Fig. 2.
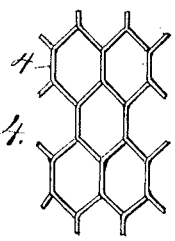
Fig. 4.
WITNESSES:
S. L. Armstrong
R. D. Brown
INVENTOR
John Collinson
BY
Wesley G. Carr
ATTORNEY

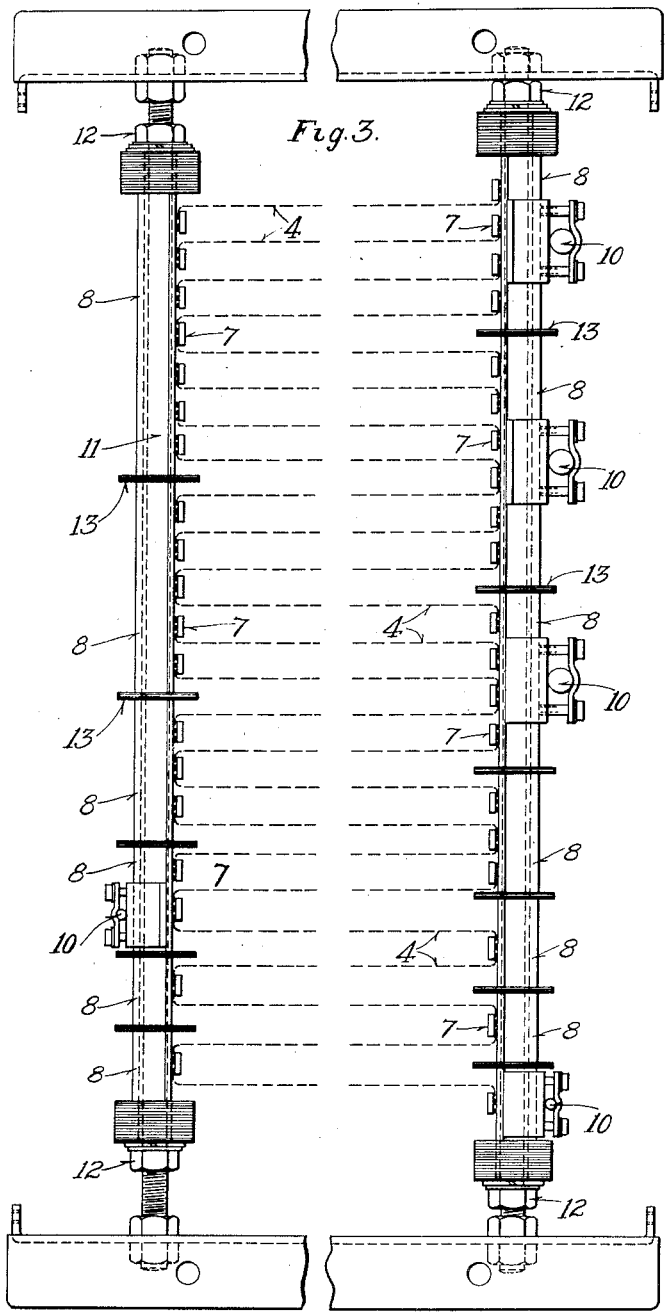

UNITED STATES PATENT OFFICE.

JOHN COLLINSON, OF MANCHESTER, ENGLAND, ASSIGNOR TO WESTINGHOUSE ELECTRIC AND MANUFACTURING COMPANY, A CORPORATION OF PENNSYLVANIA.

ELECTRICAL RESISTANCE.

1,267,978.  Specification of Letters Patent.  Patented May 28, 1918.

Application filed March 4, 1915. Serial No. 12,192.

*To all whom it may concern:*

Be it known that I, JOHN COLLINSON, a subject of the King of Great Britain, and a resident of Manchester, in the county of Lancaster, England, have invented a new and useful Improvement in Electrical Resistances, of which the following is a specification.

My invention relates to electrical resistance devices and it has for its object to provide an improved construction of electrical resistance devices of what are known as the "grid" type.

The several grids which compose resistance devices of the above-indicated character are usually supported in a frame by stringing them on insulated rods, contact between adjacent grids being maintained by the pressure exerted by nuts threaded on the ends of the supporting rods. This construction has the disadvantage that, if the nuts become slack or the rods expand or stretch, for any reason, the grids become loose on the rods and an open circuit is likely to result.

According to my present invention, the grids are made of sheet metal which may be either punched, "expanded," or otherwise treated to afford a lengthened path for the current. Uncut or unpunched terminal portions are, however, preferably left at the ends of each grid, and uncut or unpunched portions are also sometimes left at the center or at intervals along the length of the grid to which intermediate supports may be attached.

The uncut terminal or end portions at the end of each grid, or a part of them, are bent at right angles and in opposite directions. The bent portion at the end of one grid is attached to the bent portion of the adjacent grid, the two bent portions being suitably fastened together and attached to the rods or other supporting means used for holding the grids in position in the frame.

The bent portions of two adjacent grids may be fastened together by screws, rivets, or the like, but the preferred method of fastening the bent portions together and insuring good contact between them is to employ a flat metal strip to which the bent portions of the grids are secured by screws, rivets or the like. If desired, in order to secure more perfect contact between the grids, they may also be welded together at suitable points.

The grids are conveniently supported in position by eyes or terminals which are attached to the bent end portions of the grids and by means of which the grids are strung on the supporting rods in the frame. These eyes or terminals may be attached by means of the screws which, as stated above, are provided for maintaining contact between adjacent grids. This affords a very simple and strong construction, and insures good contact between adjacent grids, since the bent portions of the latter are secured between the aforementioned metal strip on one side and the eye or terminal on the other side, the screws holding these parts firmly together.

My invention is illustrated in the accompanying drawings, in which Figure 1 is a plan view and Fig. 2 a side elevational view, of a resistance device having its grids constructed, fastened together and mounted in position in accordance with my invention. Fig. 3 is a plan view, similar to Fig. 1, showing a modification of my invention. Fig. 4 is a fragmentary elevational view showing one manner in which my resistance grids may be expanded, and Fig. 5 is a transverse sectional view taken substantially along the line V—V, Fig. 1.

In the drawings, a series of separate grids is indicated at 4, each grid having its uncut or unpunched ends bent at right angles in opposite directions, as shown at 5 and 6. Each coöperating pair of grid terminals 5 and 6 is clamped between a flat strip of metal 7 and an eye or terminal piece 8, which are held firmly together by means of screws 9. The screws 9 may also be utilized to attach suitable terminal devices 10 for receiving the conductors which lead current into and out of the resistance device, or the terminals 10 may be attached to the eye pieces 8, as shown, by means of suitable clamps 15. The grids are mounted on insulated supporting rods 11 which are threaded through the eye pieces 8, the supporting rods being provided with nuts 12 for holding the several grids against movement. Insulating washers 13 are provided for insulating the grids and insuring a proper path for the passage of the current through the devices.

Fig. 3 shows a construction which may be adopted when it is desired that the current may pass through two or more grids in parallel. To accomplish this, the eye pieces 8 are increased in width to make contact with any desired number of adjacent grids.

As indicated above, the grids 4 may be punched, expanded, or otherwise modified, the general purpose of such modification being to afford a plurality of parallel-connected conducting paths for the current. Fig. 2 illustrates one method of producing this result by punching the grids 4 in the manner which is usual in the production of expanded metal, while Fig. 4 shows a portion of one of the grids which has not only been punched in the manner shown in Fig. 2 but expanded into the form shown. The two forms of grids shown in Figs. 2 and 4 are entirely equivalent, so far as their electrical characteristics are concerned, the grid of Fig. 2 being more compact than that of Fig. 4, while the latter grid is adapted for better ventilation on account of its open structure. Expanded metal has been applied to numerous mechanical structures, but, so far as I am aware, the present invention embodies the first application of such metal to electrical resistance devices.

With the improved construction herein described, it will be readily appreciated that a resistance device is provided having grids which are independently renewable and which are so attached together that the resistance of the complete device is independent of the pressure exerted by the nuts on the tie-rods on which the grids are supported, this being a very important feature.

I claim as my invention:

1. An electrical resistance device comprising a series of sheet metal resistance elements, means individual to adjacent end portions of said elements for fastening the elements together to form a continuous current path, and means for supporting the assembled elements, the said fastening means permitting the said resistance elements to be severally removed and replaced without substantially displacing the remaining elements.

2. An electrical resistance device comprising a series of sheet-metal resistance elements severally formed to provide an extended path for electric current, means individual to adjacent end portions of said elements for fastening the elements together to form a continuous current path, and means for supporting the assembled elements, the said fastening means permitting the said resistance elements to be severally removed and replaced without substantially displacing the remaining elements.

3. An electrical resistance device comprising a series of sheet-metal resistance elements having bent end portions fastened together in pairs, means individual to each adjacent pair of bent end portions for fastening the adjacent elements together, and means for supporting the assembled elements.

4. An electrical resistance device comprising a series of sheet-metal grids severally formed to provide an extended path for electric current, and having bent end portions fastened together in pairs, means individual to each adjacent pair of bent end portions for fastening the adjacent elements together, and means for supporting the assembled elements.

5. An electrical resistance device comprising a series of sheet-metal resistance elements having end portions bent in opposite directions and overlapping in pairs, means, comprising a flat strip and securing means, for clamping together each adjacent pair of bent end portions, and means for supporting the assembled elements.

6. An electrical resistance device comprising a series of laterally-opposed sheet-metal grids having end portions bent in opposite directions, means for clamping together each adjacent pair of bent end portions, terminal devices secured to certain of the said grids by the said clamping means, and means for supporting the assembled elements.

7. An electrical resistance device comprising a series of laterally-opposed sheet-metal resistance elements having end portions bent in opposite directions and overlapping in pairs, means for clamping together each adjacent pair of bent end portions, means for electrically insulating the several clamping means from each other, and means associated with the said clamping means for supporting the assembled elements.

8. An electrical resistance device comprising a series of sheet-metal resistance elements having end portions bent in opposite directions, means for clamping together each adjacent pair of bent end portions, the said clamping means comprising a flat strip engaging one of the said end portions, another member engaging the other end portion and provided with a bent eye, and means for securing the said clamping means together, and rods extending through the eyes in the said clamping members for supporting the assembled elements.

9. An electrical resistance device comprising a series of sheet-metal resistance elements having end portions bent in opposite directions, means for clamping together the adjacent pairs of bent end portions, the said clamping means comprising flat strips severally coöperating with one of the said pairs of end portions and other members severally coöperating with a predetermined number of said pairs of end portions, and terminal devices associated with the said members, whereby the said predetermined number of resistance elements are connected in parallel-circuit relation.

10. An electrical resistance device comprising a series of laterally-opposed, flat resistance elements, means individual to adjacent end portions of said elements for fastening the elements together and permitting them to be severally removed and replaced without substantially displacing the remaining elements, and means for supporting the assembled elements.

In testimony whereof, I have hereunto subscribed my name this eleventh day of February 1915.

JOHN COLLINSON.

Witnesses:
J. S. PECK,
GEORGE COWLEY.